US009746761B2

(12) United States Patent
Tippin

(10) Patent No.: US 9,746,761 B2
(45) Date of Patent: Aug. 29, 2017

(54) INTEGRATED FURNITURE SYSTEM FOR INCONSPICUOUSLY HOUSING AUDIOVISUAL EQUIPMENT

(71) Applicant: Five-Star Audiovisual, Inc., Aurora, IL (US)

(72) Inventor: Robert J. Tippin, Aurora, IL (US)

( * ) Notice: Subject to any disclaimer, the term of this patent is extended or adjusted under 35 U.S.C. 154(b) by 637 days.

(21) Appl. No.: 14/033,396

(22) Filed: Sep. 20, 2013

(65) Prior Publication Data

US 2015/0085263 A1    Mar. 26, 2015

(51) Int. Cl.
| G03B 21/58 | (2014.01) |
| A47B 81/06 | (2006.01) |
| H04N 9/31 | (2006.01) |
| G09F 15/00 | (2006.01) |

(52) U.S. Cl.
CPC .............. G03B 21/58 (2013.01); A47B 81/06 (2013.01); H04N 9/3141 (2013.01)

(58) Field of Classification Search
CPC ........ G03B 21/58; G03B 21/56; G03B 21/14; G03B 21/145; A47B 81/06; H04N 9/3141; G09F 15/0012; G09F 15/0062
USPC .................................. 353/119; 359/461, 443
See application file for complete search history.

(56) References Cited

U.S. PATENT DOCUMENTS

| 1,216,380 | A * | 2/1917 | Troeger ............... | G03B 21/625 359/454 |
| 2005/0200951 | A1* | 9/2005 | Redmon ................ | G03B 21/58 359/443 |
| 2007/0195210 | A1* | 8/2007 | Rudzki ................ | H04N 9/3141 348/838 |
| 2010/0079860 | A1* | 4/2010 | Unno ..................... | G03B 21/58 359/443 |
| 2010/0238544 | A1* | 9/2010 | Elliott .................... | G03B 21/58 359/443 |
| 2012/0206661 | A1* | 8/2012 | Risher .................... | G03B 21/56 348/789 |

* cited by examiner

Primary Examiner — William C Dowling
Assistant Examiner — Ryan Howard
(74) Attorney, Agent, or Firm — Corridor Law Group, P.C.

(57) ABSTRACT

An integrated furniture system inconspicuously houses audiovisual equipment. The system includes a projector cabinet and a columnar supported screen assembly. The assembly comprises a screen for displaying a projected image with a frame around its perimeter and a pair of columnar screen supports located at opposite side edges of the screen. Each column comprises a hollow base with a slot formed in its interior surface and a foldable column with hollow top and bottom sections interconnected by a hinge. The bottom section has an attachment plate and a tongue portion extending from an exterior surface thereof. The tongue portion is insertable within the slot in the hollow base. A bracket attaches the screen to the neighboring columnar screen support. The bracket has a pair of side rails, one which is attached to a side surface of the column facing the screen and the other rail attached to the screen frame.

20 Claims, 5 Drawing Sheets

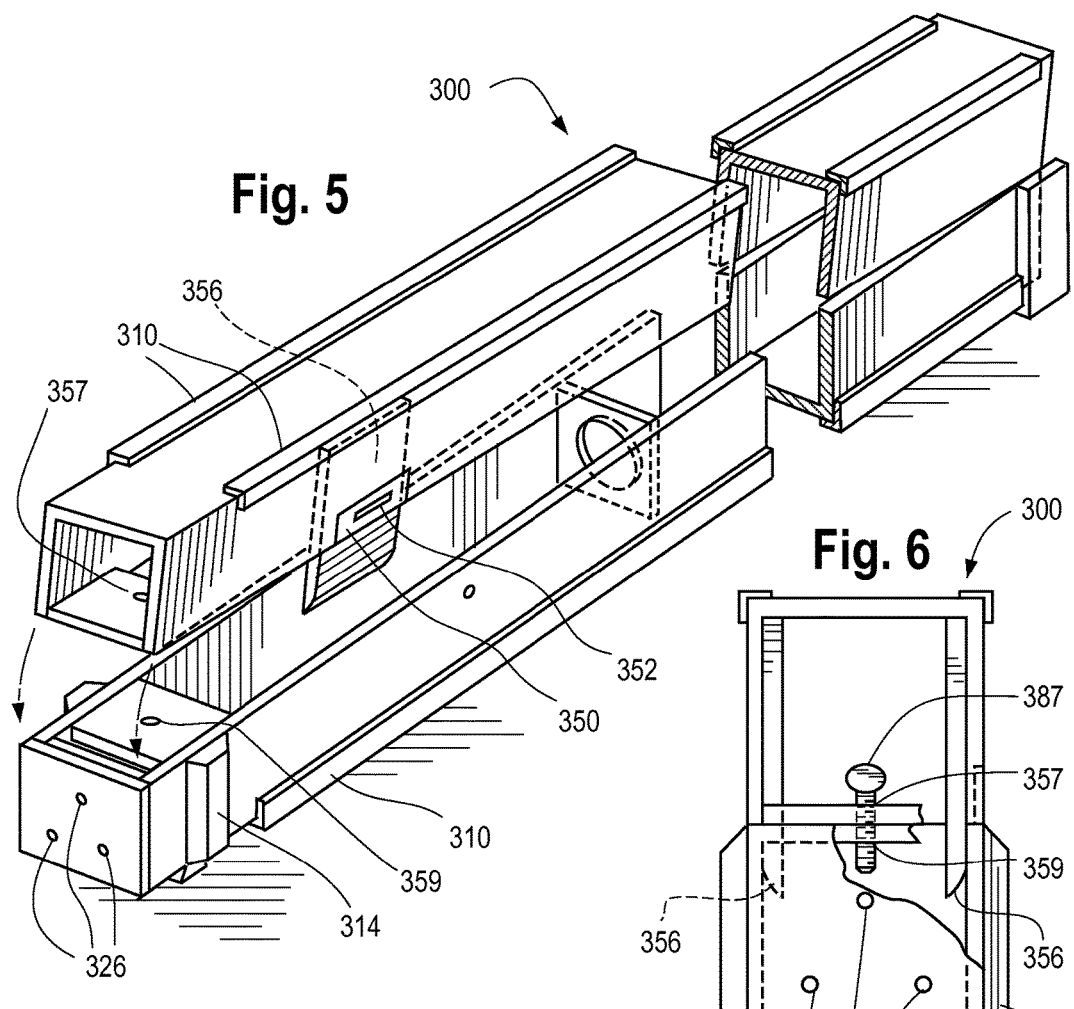
Fig. 5
Fig. 6
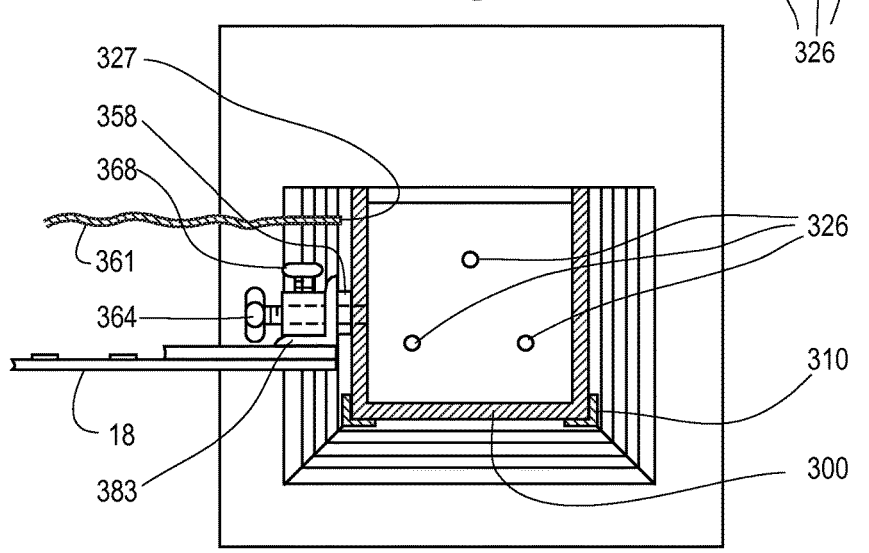
Fig. 7

INTEGRATED FURNITURE SYSTEM FOR INCONSPICUOUSLY HOUSING AUDIOVISUAL EQUIPMENT

FIELD OF THE INVENTION

The present invention relates to furniture and, in particular, to an integrated suite of furniture for inconspicuously housing audiovisual equipment.

BACKGROUND OF THE INVENTION

When audiovisual equipment is required for a conference or seminar, the equipment usually consists of a projector and a screen. In conventional audiovisual equipment setups, the projector is typically mounted on a stationary table or wheeled cart, and the cords running to and from the projector are typically visible to conference participants in the room. In addition, the presenter is typically delivering the presentation from a laptop computer connected by a cord to the projector. Besides the cord interconnecting the laptop computer to the projector, the laptop oftentimes requires recharging from a charger that must be connected to a wall or floor outlet. In many cases, to conceal the cords or to keep people from tripping, duct tape, a hollow floor runner or some other type of temporary covering is used to shroud the cords.

Additionally, in conventional audiovisual setups, the screen is typically mounted on a tripod or other stand that supports the screen from the bottom. Alternatively, the screen can be suspended on a framework formed of exposed trusses or other structural members. The framework can be shrouded with a curtain or other covering, but the visual effect can be somewhat primitive and haphazard. For conferences at which the organizer wishes to provide an elegant and professional environment, conventional audiovisual equipment setups can detract from that type of setting.

The present integrated furniture system provides inconspicuous housing for audiovisual (AV) equipment, including the projector, screen and cords. The individual units are coordinated in appearance and finish, and can be made to blend with the style and color scheme of the room in which the audiovisual equipment is to be used. The present integrated furniture system also has functional features that facilitate the setup of the AV equipment, assist the users of the equipment during their presentations, and provide conference participants with an environment that is conducive to effective learning and interactions with the presenters.

SUMMARY OF THE INVENTION

Shortcomings of conventional AV equipment setups are overcome by an integrated furniture system for inconspicuously housing for audiovisual equipment. The system comprises:
(a) a projector cabinet assembly comprising:
  (i) a cabinet having a front face, a back face and a pair of side faces interconnecting the front and back faces, the cabinet having an interior compartment for mounting a projector on a shelf therein;
  (ii) a top surface mounted on the cabinet, the surface having an opening formed therein for directing a cord into the interior compartment;
  (iii) a hinged drop-down door horizontally mounted on the cabinet front face for exposing the projector when in an open position;
  (iv) at least one hinged door vertically mounted on the cabinet back face for accessing the cabinet interior compartment when in an open position;
(b) a columnar supported screen assembly comprising:
  (i) a screen for displaying a projected image, the screen having a frame around its perimeter;
  (ii) a pair of columnar screen supports disposed at opposite side edges of the screen, each of the screen supports comprising:
    (aa) a hollow base having an interior surface and an exterior surface, the interior surface having a slot formed in its perimeter;
    (bb) a foldable column comprising a hollow bottom section and a hollow top section interconnected by a hinge, the bottom section comprising an attachment plate and a tongue portion extending from an exterior surface thereof, the tongue portion insertable within the hollow base slot, the top section comprising an attachment plate attachable to the column bottom section attachment plate when the top and bottom sections are in their folded positions;
  (iii) a bracket comprising a pair of side rails, one of the side rails attachable to a side surface of the column facing the screen and the other of the rails attachable to the screen frame.

In a preferred embodiment of the system, each column further comprises a releasable locking mechanism for maintaining the top and bottom sections in their unfolded positions.

In a preferred embodiment of the system, the columnar screen support further comprises a hollow height adapter interposable between the base and the column. The height adapter has an interior surface and an exterior surface. The interior surface has a slot formed therein at an upper portion thereof. The exterior surface has a tongue portion extending therefrom at a bottom portion thereof. The tongue portion is insertable within the slot in the hollow base and the column tongue portion is insertable within the height adapter slot.

In a preferred embodiment of the system, the columnar screen support further comprises a decorative cap mountable atop the column top section.

In a preferred embodiment of the system, each of the column attachment plates has a hole formed therein. The attachment plate holes are alignable to accommodate a fastener extended therethrough.

In a preferred embodiment of the system, each of the column hollow top and bottom sections has an interior surface. The column top section has a pair of alignment bars extending from its interior surface. The alignment bars are engageable with the column bottom section interior surface for maintaining the top and bottom sections in side-by-side alignment when in their folded positions.

In a preferred embodiment of the system, the cabinet top surface is formed of a stone or a stone-like composite material.

In a preferred embodiment of the system, the projector cabinet and the columnar screen support exterior surfaces have essentially identical finishes.

In a preferred embodiment, the system further comprises:
(c) a cord shroud comprising a length of pliable material capable of encasing at least one electrical cord extending away from the cabinet interior compartment.

The cord shroud preferably has releasable fastening material extending along its length. The fastening material preferably comprises cooperating hook and loop fastening material.

In a preferred embodiment, the cabinet, columnar supports and cord shroud exterior surfaces have essentially identical finishes.

Shortcomings of conventional AV equipment setups are also overcome by a first columnar support assembly for a screen capable of displaying a projected image and having a frame around its perimeter. The assembly comprises a pair of columnar screen supports disposed at opposite side edges of the screen. Each of the screen supports comprises:

(a) a hollow base having an interior surface and an exterior surface, the interior surface having a slot formed in its perimeter;

(b) a foldable column comprising a hollow bottom section and a hollow top section interconnected by a hinge, the bottom section comprising an attachment plate and a tongue portion extending from an exterior surface thereof, the tongue portion insertable within the hollow base slot, the top section comprising an attachment plate attachable to the column bottom section attachment plate when the top and bottom sections are in their folded positions;

(c) a bracket comprising a pair of side rails, one of the side rails attachable to a side surface of the column facing the screen and the other of the rails attachable to the screen frame.

In a preferred embodiment, the columnar support assembly further comprises a releasable locking mechanism for maintaining the column top and bottom sections in their unfolded positions.

In a preferred embodiment, the columnar support assembly further comprises a hollow height adapter interposable between the base and the column. The height adapter has an interior surface and an exterior surface. The interior surface has a slot formed therein at an upper portion thereof. The exterior surface has a tongue portion extending therefrom at a bottom portion thereof. The tongue portion is insertable within the hollow base slot and the column tongue portion is insertable within the height adapter slot.

In a preferred embodiment, the columnar screen support further comprises a decorative cap mountable atop the column top section.

In a preferred embodiment of the columnar supported screen assembly, each of the column attachment plates has a hole formed therein. The attachment plate holes are alignable to accommodate a fastener extended therethrough. Each of the column hollow top and bottom sections has an interior surface. One of the top and bottom sections has an alignment bar extending therefrom for maintaining the top and bottom sections in side-by-side alignment when in their folded positions. The column top section more preferably has a pair of alignment bars extending from its interior surface for maintaining the top and bottom sections in side-by-side alignment when in their folded positions.

Shortcomings of conventional AV equipment setups are overcome by a second columnar support assembly for a screen capable of displaying a projected image and having a frame around its perimeter. The assembly comprises a pair of columnar screen supports disposed at opposite side edges of the screen. Each of the screen supports comprises:

(a) a hollow base having an interior surface and an exterior surface, the exterior surface having a tongue portion extending therefrom;

(b) a foldable column comprising a hollow bottom section and a hollow top section interconnected by a hinge, each of the top and bottom sections having an interior surface, the bottom section comprising an attachment plate and an interior surface having a slot formed in its perimeter for accommodating the tongue portion inserted therein, the top section comprising an attachment plate attachable to the column bottom section attachment plate when the top and bottom sections are in their folded positions;

(c) a bracket comprising a pair of side rails, one of the side rails attachable to a side surface of the column facing the screen and the other of the rails attachable to the screen frame.

BRIEF DESCRIPTION OF THE DRAWINGS

FIG. 5 is a perspective view of a column in an almost folded configuration for transportation and storage.

FIG. 6 is an end elevation view of the folded column illustrated in FIG. 5, in which a locking bolt is inserted to prevent the upper and lower sections of the column from separating while folded during transportation and storage.

FIG. 7 is top view of the lower portion of one of the columnar supports, taken in the direction of arrows 7-7 in FIG. 2.

DETAILED DESCRIPTION OF PREFERRED EMBODIMENT(S)

Figure 1:
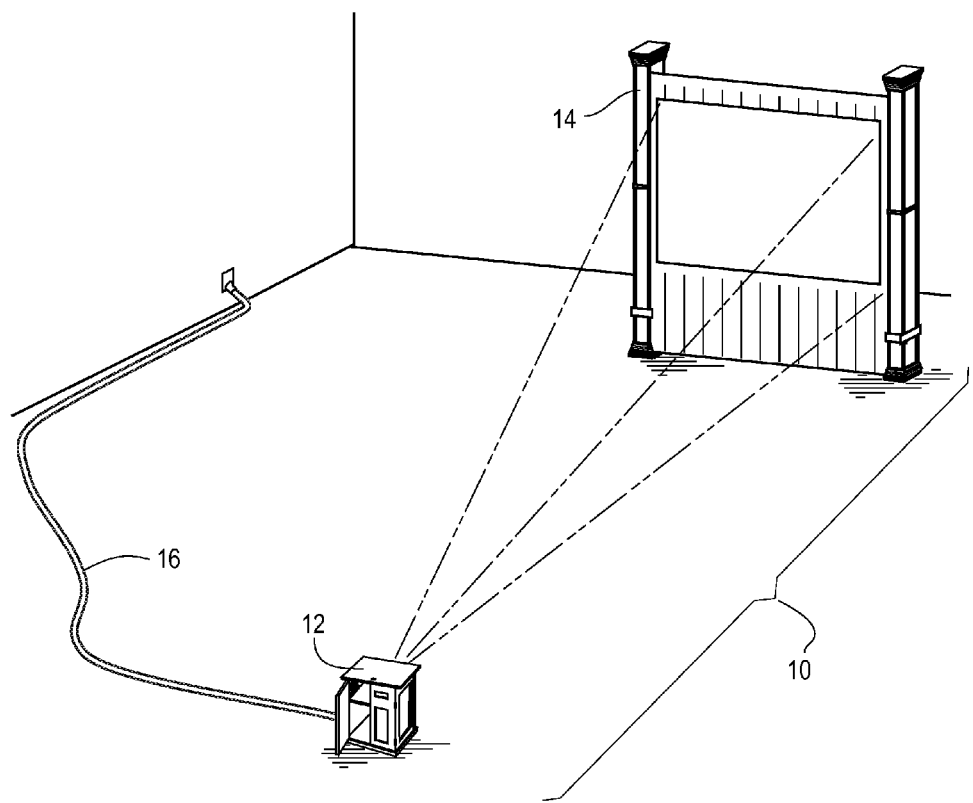
FIG. 1 is a perspective view of the present integrated furniture system for inconspicuously housing audiovisual equipment, which includes a projector cabinet, a columnar supported screen assembly, and a cord shroud for encasing cords and cables that run to and from the projector.

Turning first to FIG. 1, an integrated furniture system 10 for inconspicuously housing audiovisual equipment includes a projector cabinet 12, a columnar supported screen assembly 14, and a shroud 16 for encasing cords and cables that run to and from the projector (not shown) inside cabinet 12.

Figure 2:
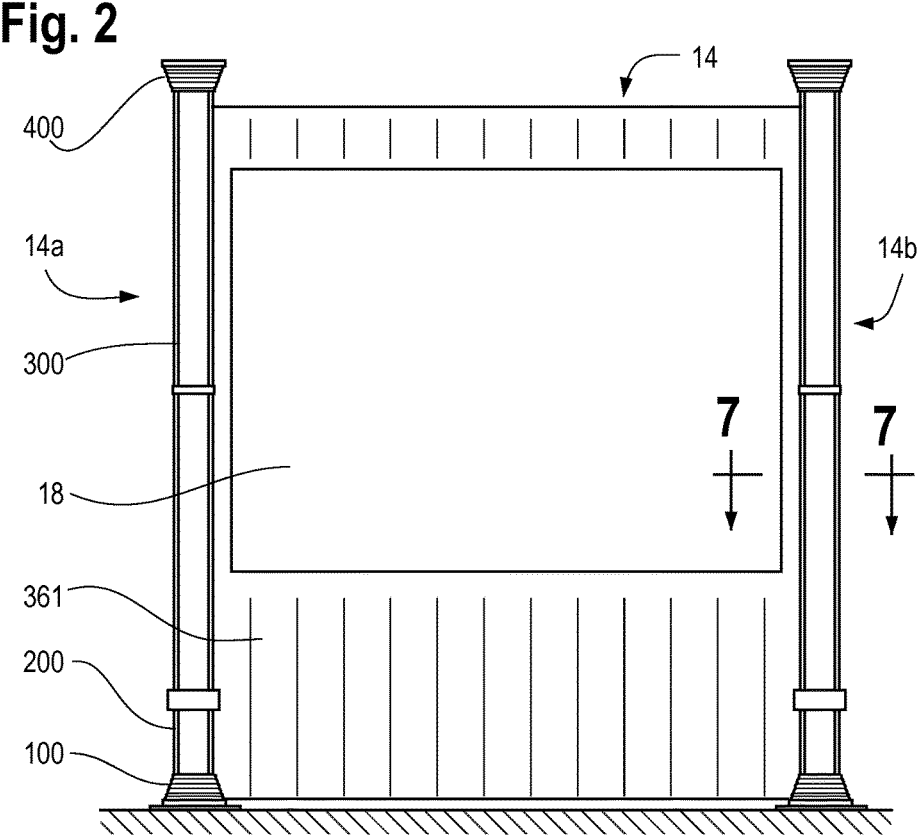
FIG. 2 is a front elevation view of the columnar supported screen assembly illustrated in FIG. 1, in which optional height adapters are inserted at the base of the columns.

Turning next to FIG. 2, columnar supported screen assembly 14 is shown as having a pair of columnar screen supports 14a and 14b, a screen 18 on which an image from the projector can be displayed, and a drape 361 to shroud the structures behind and to the side of screen 18. As further shown in FIG. 2, columnar screen support 14a includes a base 100, an optional height adapter 200, foldable column 300, and a decorative cap 400.

Figure 3:
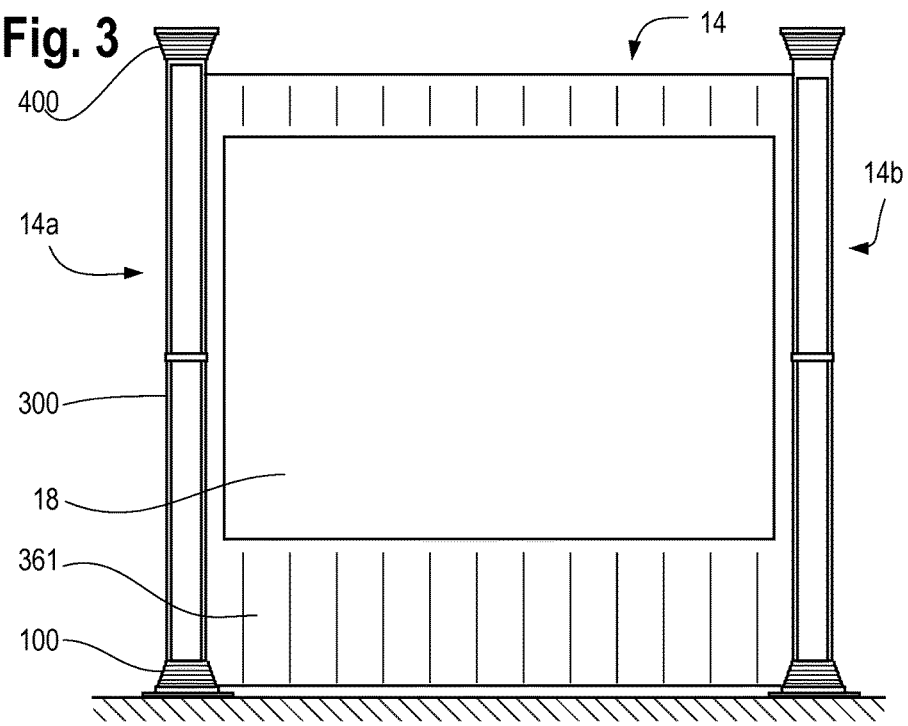
FIG. 3 is a front elevation view of the columnar supported screen assembly illustrated in FIG. 2, in which the optional height adapters at the base of the columns are omitted.

In FIG. 3, columnar supported screen assembly 14 is shown with the optional height adapters omitted, which if employed would be inserted between base 100 and column 300.

Figure 4:
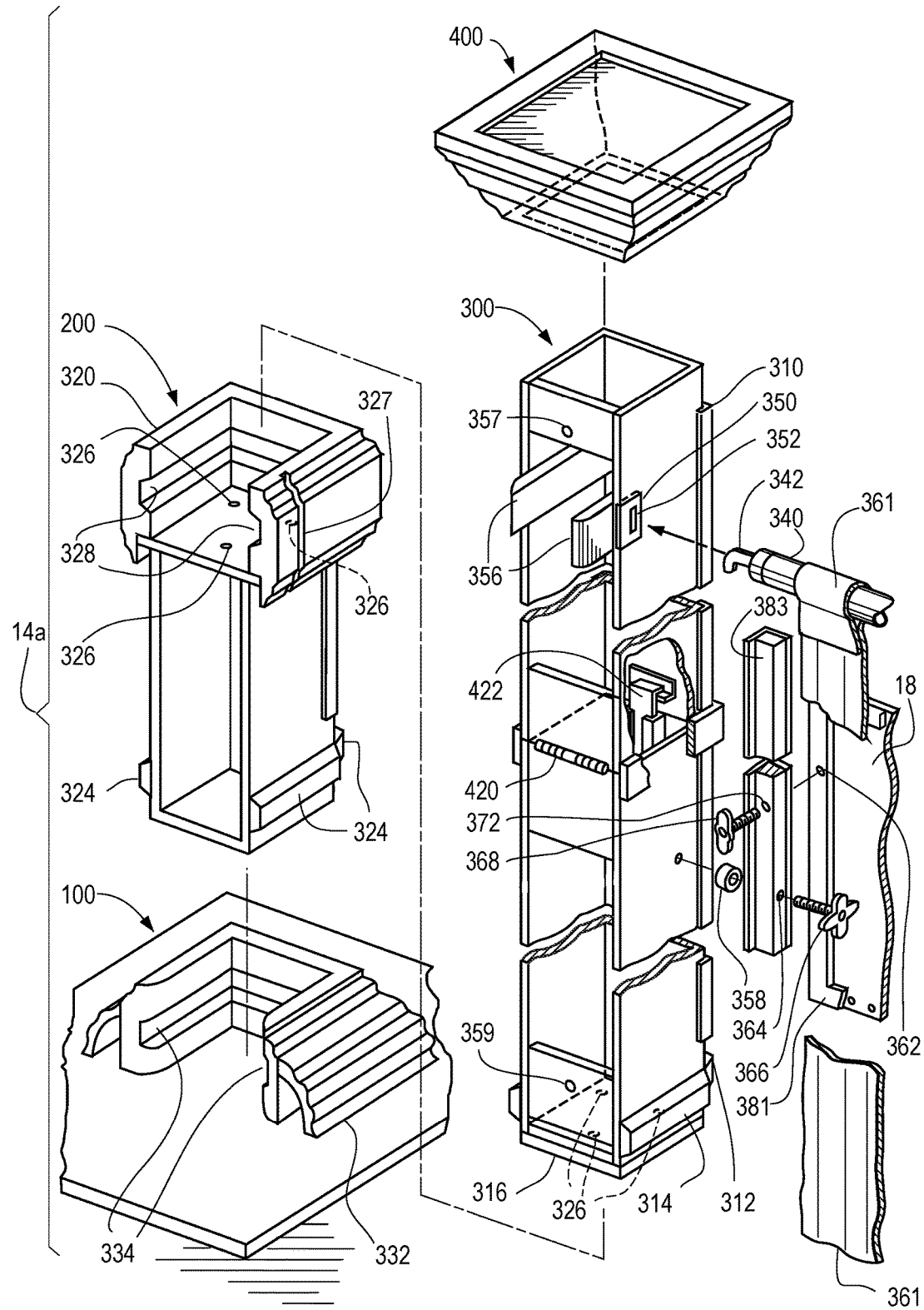
FIG. 4 is an exploded perspective view of one of the columnar screen supports of the columnar supported screen assembly illustrated in FIGS. 2 and 3.

Turning now to FIG. 4, columnar screen support 14a is shown in an exploded perspective view. Base 100 includes a planar bottom plate with an ornamental portion having an external surface 332 and in which a slot 334 is formed in its interior surface. Slot 334 is configured to be mated with the tongue portion of a column or an optional height adaptor 324, as set forth in more detail below.

As further shown in FIG. 4, optional height adapter 200 is inserted between base 100 and column 300 mounted above. Height adapter 200 is employed when the size of the screen to be supported is too tall to be suspended using the columns alone. Height adapter 200 has a tongue portion 324 that is insertable into and held securely within slot 334 in base 100. At the top of height adapter 200 is a fixture similar in configuration to base 100. The top of height adapter 200 includes an ornamental portion having an external surface 320 and in which a slot 328 is formed in its interior surface. Slot 328 is configured to be mated with the tongue portion of the column mounted above height adapter 200.

The top portion of height adapter 200 has a support plate in which three holes 326 are formed. Holes 326 align with corresponding holes in the column mounted above to accommodate fasteners extended therethrough to secure the top portion of height adapter 200 to the column above. A slit 327 is formed in the exterior surface of the top portion of height adapter 200 to accommodate and secure the side edge of a curtain or drape 361, which is also shown in FIGS. 2 and 3.

As further shown in FIG. 4, column 300 includes a plate 316 and an upstanding frame having a tongue portion 314 that is insertable into and held securely within slot 328 in the top portion of height adapter 200. Plate 316 has three holes formed therein, which align with corresponding holes 326 in the top portion of height adapter 200 mounted below to accommodate fasteners extended therethrough to secure column 300 to the top portion of height adapter 200. The front portion 312 of tongue portion 314 slides horizontally into slot 328 in height adapter 200.

Proceeding vertically upward, column 300 includes a hinge 420 that permits the upper portion of column 300 to be folded into side-by-side alignment with the lower section of column 300. A locking mechanism 422 secures the upper and lower sections of column 300 when in a vertically extended position. A pair of alignment bars 356 extending from the upper portion of column 300 are insertable within the interior of the lower section of column 300 to keep the upper and lower sections from becoming misaligned and imposing undesirable torsional force upon hinge 420. The upper section of column 300 has an attachment plate with a hole 357 formed therein, which aligns with a corresponding attachment plate in the lower section of column 300 with a hole 359 formed therein. When in the folded position, holes 357 and 359 align to accommodate a fastener (not shown in FIG. 4) extended therethrough to secure the upper section of column 300 to the lower section, thereby preventing the upper and lower sections from separating when in a folded position.

As further shown in FIG. 4, a screen support bracket 383 has holes formed therein on its rear face, one of which is shown as hole 372, to accommodate a threaded fastener 368 with a knob. Threaded fastener 368 extends into a corresponding threaded hole 362 formed in a frame 381 mounted on the perimeter of screen 18. Similarly, bracket 383 has holes formed therein on its side face, one of which is shown as hole 364, to accommodate a threaded fastener 366 with a knob. Threaded fastener 366 extends through a spacer 358 and into a corresponding threaded hole formed in the interior side panel of column 300.

A rod 340 has a drape 361 suspended therefrom. Rod 340 has an end prong 342 that is insertable into and securable within a corresponding slot 352 in a plate 350 on the interior side panel of column 300.

Decorative cap 400 fits atop column 300, which has a strip of molding 310 extending vertically to support decorative cap 400 when mounted on column 300.

FIG. 5 shows column 300 in a folded configuration for transportation and storage. As shown, alignment bar 356 extends from the upper section of column 300 and is insertable within the interior of the lower section of column 300 to keep the upper and lower sections from becoming misaligned.

Turning now to FIG. 6, column 300 is shown in an end view in its folded position. A locking bolt 387 is inserted through aligned holes 357 and 359 to secure the upper section of column 300 to the lower section, thereby preventing the upper and lower sections from separating when in their folded positions.

In FIG. 7, column 300 is shown as having support bracket 383 attached by threaded fastener 364 with a spacer 358 therebetween. Screen 18 is attached to bracket 383 by threaded fastener 368. Drape 361 is shown as secured in slit 327 formed in the exterior surface of the height adapter positioned below.

Figure 8:
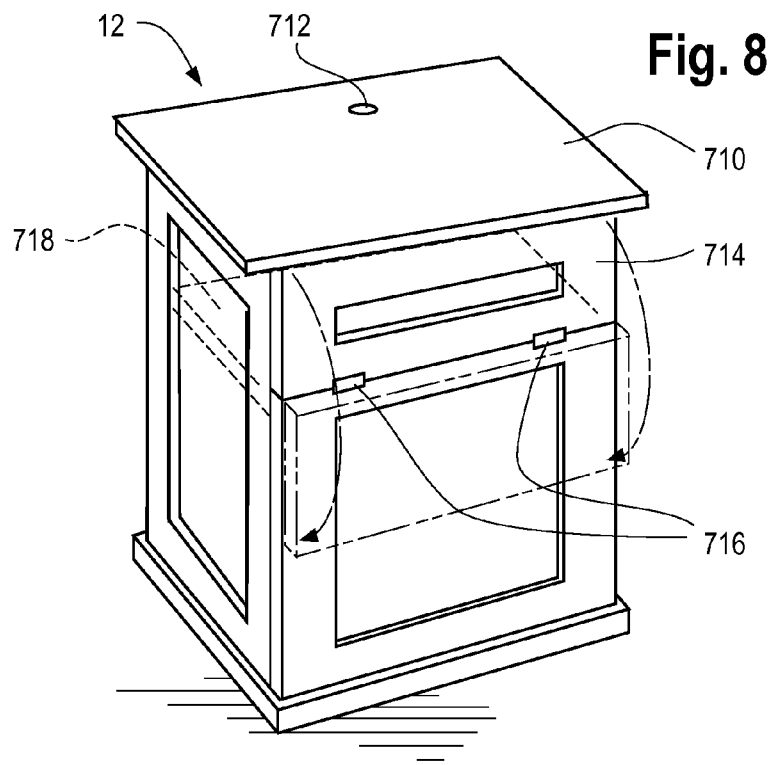
FIG. 8 is a perspective view of the projector cabinet illustrated in FIG. 1, showing in particular the front face of the cabinet with a horizontally hinged drop-down door for exposing the projector.

FIG. 8 shows that projector cabinet 12 includes a top surface 710 with a hole 712 formed therein for accommodating cables running between the projector (not shown) stored in the interior compartment of projector cabinet 12 to the laptop or other computing device (not shown) positioned on top surface 710. A drop-down door 714 is mounted horizontally on cabinet 12 by hinges 716 to expose the front of the projector located on a shelf in the interior compartment of projector cabinet 12.

Figure 9:
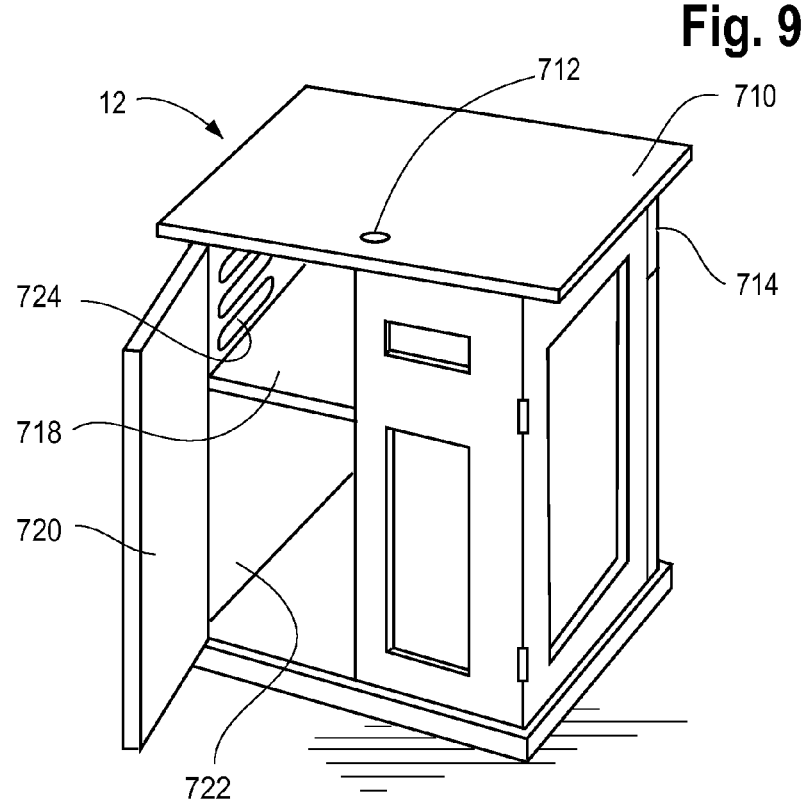
FIG. 9 is a perspective view of the projector cabinet illustrated in FIG. 1, showing in particular the back face of the cabinet with vertically hinged doors, one of which is shown in the open position to expose the interior compartment of the projector cabinet, including the ventilation slots formed in a side panel.

FIG. 9 shows the back face of projector cabinet 12, which includes a pair of vertically hinged doors, one of which is shown in the open position as door 720, to expose the interior compartment of the projector cabinet, including the ventilation slots 724 formed in a side panel 722. A shelf 718 supports the projector.

Projector cabinet 12 preferably has a top surface 712 formed of a durable stone or stone-like composite material. The user will typically place their laptop on surface 712 when making their presentation. The exterior finish of cabinet 12 is preferably made to match the exterior finish of columnar screen supports 14a and 14b.

Returning to FIG. 1, cord shroud 16 can be formed of a pliable yet durable material that can encase the various cords and cables running to and from the projector, laptop and any other electronic equipment. Once wrapped around the cords and cables, cord shroud 16 is fastened together along its length, preferably using a strip of cooperating hook and loop fastening material. As shown, cord shroud runs from the interior compartment of projector cabinet 12 to a wall socket that provides electric power and optionally a cable television connection depending upon the type of presentation and equipment being used. The exterior finish of cord shroud 16 is preferably made to match the exterior finish of projector cabinet 12 and columnar screen supports 14a and 14b.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An integrated furniture system for inconspicuously housing audiovisual equipment, the system comprising:
   (a) a projector cabinet assembly comprising:
      (i) a cabinet having a front face, a back face and a pair of side faces interconnecting said front and back faces, said cabinet having an interior compartment for mounting a projector on a shelf therein;
      (ii) a top surface mounted on said cabinet, said top surface having an opening formed therein for directing a cord into said interior compartment;
      (iii) a hinged drop-down door horizontally mounted on said cabinet front face for exposing said projector when in an open position;
      (iv) at least one hinged door vertically mounted on said cabinet back face for accessing said cabinet interior compartment when in an open position;
   (b) a columnar supported screen assembly comprising:
      (i) a screen for displaying a projected image, said screen having a frame around its perimeter;
      (ii) a pair of columnar screen supports disposed at opposite side edges of said screen, each of said screen supports comprising:
         (aa) a hollow base having an interior surface and an exterior surface, said interior surface having a slot formed in its perimeter;
         (bb) a foldable column comprising a hollow bottom section and a hollow top section interconnected by a hinge, said bottom section comprising an attachment plate and a tongue portion extending from an exterior surface thereof, said tongue portion insertable within said hollow base slot, said top section comprising an attachment plate attachable to said column bottom section attachment plate when said top and bottom sections are in their folded positions;
         (iii) a bracket comprising a pair of side rails, one of said side rails attachable to a side surface of said column facing said screen and the other of said rails attachable to said screen frame.

2. The integrated furniture system of claim 1, wherein each of said columns further comprises a releasable locking mechanism for maintaining said column top and bottom sections in their unfolded positions.

3. The integrated furniture system of claim 1, wherein said column screen support further comprises a hollow height adapter interposable between said base and said column, said height adapter having an interior surface and an exterior surface, said interior surface having a slot formed therein at an upper portion thereof, said exterior surface having a tongue portion extending therefrom at a bottom portion thereof, said tongue portion insertable within said hollow base slot, said column tongue portion insertable within said height adapter slot.

4. The integrated furniture system of claim 1, wherein said columnar screen support further comprises a decorative cap mountable atop said column top section.

5. The integrated furniture system of claim 1, wherein each of said column attachment plates has a hole formed therein, said attachment plate holes alignable to accommodate a fastener extended therethrough.

6. The integrated furniture system of claim 5, wherein each of said column hollow top and bottom sections has an interior surface, and wherein said column top section has a pair of alignment bars extending from its interior surface, said alignment bars engageable with said column bottom section interior surface for maintaining said top and bottom sections in side-by-side alignment when in their folded positions.

7. The integrated furniture system of claim 1, wherein said cabinet top surface is formed of a stone or a stone-like composite material.

8. The integrated furniture system of claim 1, wherein said projector cabinet and column screen support exterior surfaces have essentially identical finishes.

9. The integrated furniture system of claim 1, further comprising:
   (c) a cord shroud comprising a length of pliable material capable of encasing at least one electrical cord extending away from said cabinet interior compartment.

10. The integrated furniture system of claim 9, wherein said cord shroud has releasable fastening material extending along its length.

11. The integrated furniture system of claim 10, wherein said fastening material comprises cooperating hook and loop fastening material.

12. The integrated furniture system of claim 9, wherein said projector cabinet, columnar screen support and cord shroud exterior surfaces have essentially identical finishes.

13. A columnar support assembly for a screen capable of displaying a projected image and having a frame around its perimeter, the assembly comprising a pair of columnar screen supports disposed at opposite side edges of said screen, each of said screen supports comprising:
   (a) a hollow base having an interior surface and an exterior surface, said interior surface having a slot formed in its perimeter;
   (b) a foldable column comprising a hollow bottom section and a hollow top section interconnected by a hinge, said bottom section comprising an attachment plate and a tongue portion extending from an exterior surface thereof, said tongue portion insertable within said hollow base slot, said top section comprising an attachment plate attachable to said column bottom section attachment plate when said top and bottom sections are in their folded positions;
   (c) a bracket comprising a pair of side rails, one of said side rails attachable to a side surface of said column facing said screen and the other of said rails attachable to said screen frame.

14. The columnar support assembly of claim 13, wherein each of said columns further comprises a releasable locking mechanism for maintaining said column top and bottom sections in their unfolded positions.

15. The columnar support assembly of claim 13, further comprising a hollow height adapter interposable between said base and said column, said height adapter having an interior surface and an exterior surface, said interior surface having a slot formed therein at an upper portion thereof, said exterior surface having a tongue portion extending therefrom at a bottom portion thereof, said tongue portion insertable within said hollow base slot, said column tongue portion insertable within said height adapter slot.

16. The columnar support assembly of claim 13, wherein said columnar screen support further comprises a decorative cap mountable atop said column top section.

17. The columnar support assembly of claim 13, wherein each of said column attachment plates has a hole formed therein, said attachment plate holes alignable to accommodate a fastener extended therethrough.

18. The columnar supported screen assembly of claim 17, wherein each of said column hollow top and bottom sections has an interior surface, one of said top and bottom sections having an alignment bar extending therefrom for maintaining said top and bottom sections in side-by-side alignment when in their folded positions.

19. The columnar supported screen assembly of claim 18, wherein said column top section has a pair of alignment bars extending from its interior surface for maintaining said top and bottom sections in side-by-side alignment when in their folded positions.

20. A columnar support assembly for a screen capable of displaying a projected image and having a frame around its perimeter, the assembly comprising a pair of columnar screen supports disposed at opposite side edges of said screen, each of said columnar screen supports comprising:
  (a) a hollow base having an interior surface and an exterior surface, said interior surface having a slot formed in its perimeter;
  (b) a foldable column comprising a hollow bottom section and a hollow top section interconnected by a hinge, each of said top and bottom sections having an interior surface, said bottom section comprising an attachment plate and an exterior surface having a tongue portion extending therefrom, said tongue portion insertable within said slot in said hollow base, said top section comprising an attachment plate attachable to said column bottom section attachment plate when said top and bottom sections are in their folded positions;
  (c) a bracket comprising a pair of side rails, one of said side rails attachable to a side surface of said column facing said screen and the other of said rails attachable to said screen frame.

* * * * *